(12) United States Patent
Ledenev et al.

(10) Patent No.: US 10,318,122 B2
(45) Date of Patent: Jun. 11, 2019

(54) DETERMINING EVENT AND INPUT COVERAGE METRICS FOR A GRAPHICAL USER INTERFACE CONTROL INSTANCE

(71) Applicant: Hewlett-Packard Development Company, L.P., Houston, TX (US)

(72) Inventors: Alexei Ledenev, Nes-Ziona (IL); Ilan Shufer, Tel Aviv (IL); Yaron Burg, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 474 days.

(21) Appl. No.: 14/761,583

(22) PCT Filed: Feb. 27, 2013

(86) PCT No.: PCT/US2013/027862
§ 371 (c)(1),
(2) Date: Jul. 16, 2015

(87) PCT Pub. No.: WO2014/133493
PCT Pub. Date: Sep. 4, 2014

(65) Prior Publication Data
US 2015/0339019 A1  Nov. 26, 2015

(51) Int. Cl.
| | | |
|---|---|---|
| *G06F 3/048* | (2013.01) | |
| *G06F 3/0484* | (2013.01) | |
| *G06F 3/0481* | (2013.01) | |
| *G06F 11/36* | (2006.01) | |
| *G06F 9/451* | (2018.01) | |

(52) U.S. Cl.
CPC ........ *G06F 3/0484* (2013.01); *G06F 3/04817* (2013.01); *G06F 11/3676* (2013.01); *G06F 9/451* (2018.02)

(58) Field of Classification Search
CPC .............. G06F 3/0481; G06F 11/3688; G06F 11/3676; G06F 11/3692; G06F 11/3696
See application file for complete search history.

(56) References Cited

U.S. PATENT DOCUMENTS

| | | |
|---|---|---|
| 6,192,511 B1 | 2/2001 | Johnston et al. |
| 7,337,432 B2 | 2/2008 | Dathathraya et al. |
| 7,596,778 B2 | 9/2009 | Kolawa et al. |
| 2002/0091968 A1 | 7/2002 | Moreaux et al. |
| 2008/0235633 A1 | 9/2008 | Ghiloni et al. |
| 2010/0146420 A1 | 6/2010 | Bharadwaj et al. |
| 2011/0138357 A1 | 6/2011 | Mishra et al. |

(Continued)

FOREIGN PATENT DOCUMENTS

CN   101916225 A   12/2010

OTHER PUBLICATIONS

ClickTale Ltd., "ClickTale Heatmap Suite," Jan. 15, 2013, <http://web.archive.org/web/20130115130551/http://www.clicktale.com/product/mouse_click>.

(Continued)

*Primary Examiner* — Matthew Ell

(57) ABSTRACT

Examples disclosed herein relate to determining event and input coverage metrics for a graphical user interface (GUI) control instance. Examples include accessing event and input occurrence data identifying interactions performed on a GUI of an application, determining an event coverage metric for the given GUI control instance based on the event occurrence data, and determining an input coverage metric for the given GUI control instance based on the input occurrence data.

14 Claims, 3 Drawing Sheets

(56) References Cited

U.S. PATENT DOCUMENTS

| | | |
|---|---|---|
| 2011/0197176 A1 | 8/2011 | Muharsky et al. |
| 2011/0214107 A1 | 9/2011 | Barmeir et al. |
| 2012/0023484 A1 | 1/2012 | Demant et al. |
| 2012/0174069 A1 | 7/2012 | Zavatone |
| 2013/0024842 A1 | 1/2013 | Browne et al. |

OTHER PUBLICATIONS

ClickTale Ltd., "Mouse Tracking Suite," Jan. 15, 2013, <http://web.archive.org/web/20130115125957/http://www.clicktale.com/product/mouse_tracking_suite>.

ClickTale Ltd., "Click Heatmaps," Jan. 15, 2013, <http://web.archive.org/web/20130115130551/http://www.clicktale.com/product/mouse_click>.

ClickTale Ltd., "Visualize visitors' interactions," Jan. 31, 2013, <http://web.archive.org/web/20130131015251/http://www.clicktale.com/>.

Hewlett-Packard Development Company, L.P., "HP Requirements Management," Data Sheet, Aug. 2010, available at http://www.hp.com/hpinfo/newsroom/press_kits/2010/HPSoftwareUniverseBarcelona2010/HP_Requirements_Management_data_sheet.pdf.

International Search Report & Written Opinion received in PCT Application No. PCT/US2013/027862, dated Nov. 25, 2013, 13 pages.

Memon, A., "A Comprehensive Framework for Testing Graphical User Interfaces," Diss., 2001, University of Pittsburg, availbale at http://www.cs.virginia.edu/~soffa/research/dissertations/atif.thesis.pdf.

Memon, A., et al., "Regression Testing of GUIs," Sep. 1-5, 2003, ESEC/FSE '03, avaliable at http://ssltest.cs.umd.edu/~atit/papers/MemonFSE2003.pdf.

Memon, A.M. et al, "Coverage Criteria for GUI Testing," (Research Paper), Proceedings of the 8th European software engineering conference held jointly with 9th ACM SIGSOFT international symposium on Foundations of software engineering, Aug. 1, 2001, pp. 256-267.

Rauf, A. et al., "Fully Automated GUI Testing and Coverage Analysis Using Genetic Algorithms," Jun. 2011, International Journal of Innovative Computing, Information and Control, vol. 7, No. 6, pp. 3281-3294, available at http://www.ijicic.org/ijicic-09-1178.pdf.

Smartbear Software, "Introduction, Webs Services Covage," SoapUI retrieved Jan. 30, 2013, avaliable at http://www.soapui.org/Coverage/introduction.html.

Wikipedia, "HP Application Lifecycle Management," Dec. 29, 2012, available at http://en.wikipedia.org/w/index.php?title=HP_Application_Lifecycle_Management&oldid=530231490.

Wikipedia, "Code coverage," Jan. 17, 2013, available at http://en.wikipedia.org/wiki/Code_coverage.

European Search Report received in PCT Application No. PCT/US2013027862, dated Aug. 19, 2016, 7 pages.

1

DETERMINING EVENT AND INPUT COVERAGE METRICS FOR A GRAPHICAL USER INTERFACE CONTROL INSTANCE

BACKGROUND

In the process of developing a computer application, several tests may be performed on the application to determine whether the application functions as designed. However, data regarding the success or failure of such tests may not indicate whether the application was tested thoroughly, and may thus be a poor indicator of application quality. For example, a set of test results may indicate that the application passed all of the applied tests. However, if the tests focused exclusively on a small portion of the application, then these results would not be a reliable indicator of the quality of the application.

BRIEF DESCRIPTION OF THE DRAWINGS

The following detailed description references the drawings, wherein.

DETAILED DESCRIPTION

As noted above, data regarding the success or failure of tests performed on an application may not indicate whether the application was tested thoroughly. In some examples, a code coverage tool may be used to quantify the thoroughness of tests performed on an application. In such examples, the code coverage tool may track and report how much of the application was covered by the tests in terms of the source code of the application. For example, the code coverage tool may report information regarding which lines of the source code were executed during the performance of the tests.

While this type of information may be useful to application programmers, it may not be useful to testing personnel tasked with testing the graphical user interface (GUI) of an application. As noted above, such code coverage tools may track and indicate the test coverage in terms of the source code, and not in terms of GUI control interfaces (e.g., windows, pages, etc.) of the GUI, and the various instances of GUI controls (e.g., buttons, textboxes, etc.) included in each of the control interfaces. Because GUI testing personnel may have little or no knowledge of the source code-level implementation of the application and how that correlates to GUI control instances and interfaces, the GUI testing personnel may not be able to determine the test coverage for the GUI based on the source code coverage information.

For example, it may be difficult for testing personnel to ascertain, from source code coverage information, how thoroughly particular GUI control instances were tested. For example, a GUI control instance (e.g., a textbox, a dropdown list, etc.) may have both a set of events it can react to (e.g., mouse click, mouse over, etc.), and various data values (e.g., text strings, etc.) that can be input to it. However, the testing personnel may not be able to readily determine, from source code coverage information, whether tests performed on an application covered both the possible events and input data associated with a particular GUI control instance, or the thoroughness of any such tests.

To address these issues, examples described herein may access event and input occurrence data identifying interactions performed on a GUI of an application during testing of the GUI, determine an event coverage metric for a given GUI control instance of the GUI based on the event occurrence data, and determine an input coverage metric for the given GUI control instance based on the input occurrence data. In this manner, by determining both event and input coverage for particular GUI control instances, examples described herein may provide a thorough indication of the testing coverage of GUI control instances in a manner that is useful to GUI testing personnel.

Figure 1:
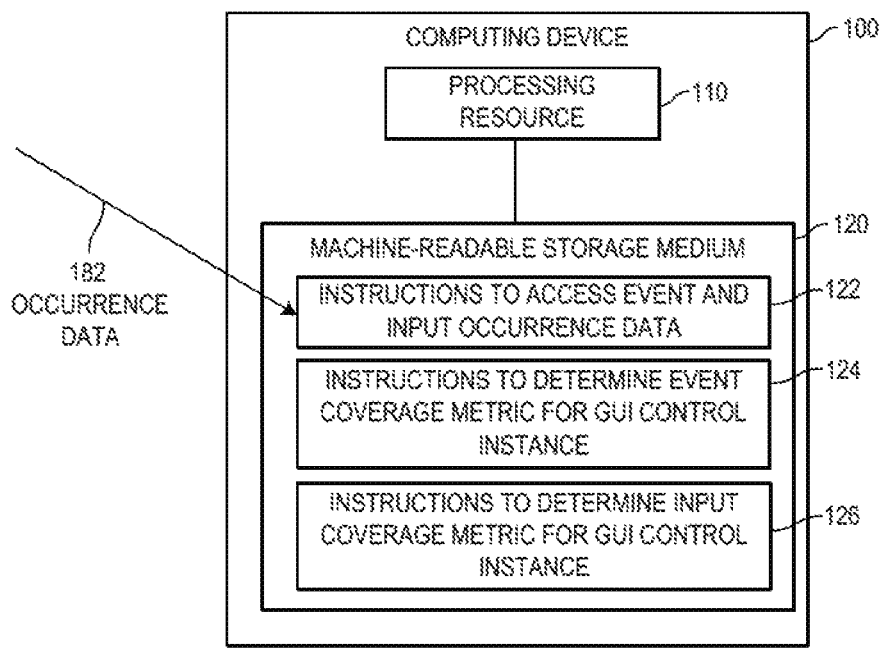
FIG. 1 is a block diagram of an example computing device to determine event and input coverage metrics for a graphical user interface (GUI) control instance.

Referring now to the drawings, FIG. 1 is a block diagram of an example computing device 100 to determine event and input coverage metrics for a GUI control instance. As used herein, a 'computing device' may be a desktop computer, notebook computer, workstation, tablet computer, mobile phone, smart device, server, or any other processing device or equipment. In the example of FIG. 1, computing device 100 includes a processing resource 110 and a machine-readable storage medium 120 encoded with instructions 122, 124, and 126. In some examples, storage medium 120 may include additional instructions. In some examples, instructions 122, 124, 126, and any other instructions described herein in relation to storage medium 120 may be stored on a machine-readable storage medium remote from but accessible to computing device 100 and processing resource 110.

In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to perform the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a Compact Disc Read Only Memory (CD-ROM), any other type of compact disc, a DVD, etc.), and the like, or a combination thereof. Further, any machine-readable storage medium described herein may be non-transitory.

In the example of FIG. 1, computing device 100 may determine event and input coverage metrics for a given GUI control instance of a GUI of an application, based on testing data associated with testing performed on the GUI. As used herein, a "GUI control" is a graphical element of a GUI through which interaction, with an application (system, component, etc.) for which the GUI is an interface, may be performed. In examples described herein, an "application" may be any system, component, program, website, web application, or any other type of software implemented in the form of executable instructions encoded on a machine-readable storage medium.

In examples described herein, a GUI may include any of various types of simple and complex GUI controls. Examples of different types of simple GUI controls may include a button, a link, a textbox, a dropdown list, and a menu, and the like. Complex GUI controls may comprise multiple simple GUI controls. Examples of different types of complex GUI controls may include a calendar, a tree, an editable grid, and the like. A single instance of a GUI control of a particular type of simple or complex GUI control may be referred to herein as a "GUI control instance." For example, in a GUI including a plurality of GUI controls of the same type (e.g., a plurality of buttons), each of the GUI controls of the plurality (e.g., each button) is a distinct GUI control instance.

The testing performed on the GUI may include at least one interaction with each of at least one GUI control instance of the GUI. The interactions with the GUI control instances may be performed manually, via an automated process (e.g., via script(s)), or a combination thereof. In examples described herein, an interaction with a GUI control instance may include the invocation of at least one event associated with the GUI control instance, the input of a data value to the GUI control instance, or a combination thereof.

In some examples, each GUI control instance of the GUI may be associated with at least one type of event to which the GUI control instance may react. For example, a GUI control instance may react to a first type of event in which a graphical pointer (or cursor) controlled by a pointing device (e.g., a mouse input device) is positioned over the GUI control instance (e.g., a "mouse-over" event type), a second type of event in which the GUI control instance is clicked with a pointing device (e.g., a "click" event type), a third type of event in which the GUI control instance is given input focus (e.g., a "focus" event type), and any other suitable type of event, or any combination thereof. In such examples, the application for which the GUI is an interface may perform respective functionalities in response to each type of event associated with a GUI control instance of the GUI. For example, the application may include an event handler for at least some types of events associated with a GUI control instance and, in response to performance of an event of a type associated with the GUI control interface, the application may invoke the respective event handler to perform the associated functionalities.

Different GUI control instances may be associated with different types of events. For example, GUI control instances of different GUI control types may be associated with different combinations of event types. For example, a button may be associated with several types of events, including mouse-over, click, and focus event types. In such examples, a calendar control may be associated with a type of event in which a date is selected (e.g., a "select-date" event type), a type of event in which it is requested that the calendar be advanced to the next month (e.g., a "next-month" event type), and the like, in addition to at least one of the types of events associated with the button. In some examples, for a given GUI control instance, events of different types are events that may be invoked in different ways (e.g., by different interaction or input), trigger different functionalities, or the like, or a combination thereof.

In some examples, at least one GUI control instance of the GUI may receive data value(s) as input to the GUI control instance. For example, a GUI control instance able to receive input of any data value of a set of data values presented for selection by the GUI control instance may be referred to herein as an "input selection GUI control instance." A dropdown list is one examples of such a GUI control instance. Some examples may include input selection GUI control instances of different GUI control types. A GUI control instance (e.g., a textbox, etc.) able to receive data value(s) input to the GUI control instance via at least one input device, such as a keyboard, and not constrained to a set of data values presented by the GUI control instance, may be referred to herein as a "free input GUI control instance." Some examples may include free input GUI control instances of different GUI control types. In examples described herein, a data value input to a GUI control instance may be information in any form or format.

In examples described herein, the testing may be performed by or utilizing at least one testing tool (e.g., testing application, testing suite, etc.). For example, a user may utilize the testing tool to perform at least one of manual and automated testing of the GUI. In examples described herein, the testing tool may record testing data identifying interactions performed on the GUI during the testing of the GUI. In some examples, the testing data may include at least one of event occurrence data and input occurrence data for each of a plurality of GUI control instances of the GUI. In some examples, the plurality of GUI control instances of a GUI for which the testing tool records event occurrence data and input occurrence data may include each GUI control instance of the GUI, or less than all of the GUI control instances of the GUI. For example, the testing tool may record at least one of event and input occurrence data for each of a plurality of GUI control instances that the testing tool is able to recognize as GUI control instances, which may be less than all of the GUI control instances of the GUI.

The testing tool may record event occurrence data for each GUI control instance of the plurality of GUI control instances. In some examples, for each of the plurality of GUI control instances, the event occurrence data may identify the types of events associated with the GUI control instance that were invoked during the testing of the GUI. For example, in response to invocation of a particular type of event (e.g., a click event, a mouse-over event, etc.) for a given GUI control instance during the testing performed on the GUI, the testing tool may record event occurrence data indicating that the particular type of event was invoked for the given GUI control instance.

In some examples, for each of the plurality of GUI control instances, the testing tool may record the event occurrence data for each event type of a set of target event type(s) associated with the given GUI control instance. In some examples, the set of target event types associated with a given GUI control instance may include each type of event associated with the given GUI control instance. In other examples, the set of target event types associated with a given GUI control instance may be a select set of less than all of the types of events associated with the given GUI control instance. In such examples, the testing tool may record the event occurrence data for each of the target event types, while ignoring the invocation of any other types of events associated with the given GUI control interface.

The testing tool may also record input occurrence data for GUI control instance(s), among the plurality of GUI control instances, that are able to receive data values as input. For example, the testing tool may record input occurrence data for input selection GUI control instances and free input GUI control instances among the plurality of GUI control instances. In examples described herein, in response to the input of a particular data value to a given GUI control instance during the testing performed on the GUI, the testing tool may record input occurrence data indicating that the particular data value was input to the given GUI control instance.

For example, if a particular data value presented for selection by an input selection GUI control instance is input to the GUI control instance during the testing performed on the GUI, then the testing tool may record input occurrence data indicating that the particular data value was input to the GUI control instance. As another example, if a particular data value is input to a free input GUI control instance during the testing performed on the GUI and the data value is included in either a valid or invalid data set associated with the GUI control instance, then the testing tool may record input occurrence data indicating that the particular data value was input to the GUI control instance.

In the example of FIG. 1, instructions 122 may access event and input occurrence data 182 identifying interactions performed on a GUI of an application during testing of the GUI, wherein the GUI comprises a given GUI control instance. To access occurrence data 182, instructions 122 may request, receive, retrieve, or otherwise actively or passively acquire occurrence data 182, or combination thereof. In some examples, instructions 122 may access occurrence data 182 stored in memory of computing device 100. In other examples, instructions 122 may access occurrence data 182 stored, at least in part, in a database remote from but accessible to computing device 100. In examples described herein, occurrence data 182 may identify the interactions performed on the GUI during one test of the GUI or during a plurality of different tests of the GUI. In such examples, the occurrence data 182 may identify interactions performed on the GUI via computing device 100 (e.g., by a testing tool implemented by computing device 100) while computing device 100 executes the GUI, via another computing device remote from computing device 100, or a combination thereof.

The accessed occurrence data 182 may include event occurrence data identifying types of events associated with the given GUI control instance that were invoked during the testing of the GUI. The accessed occurrence data 182 may also include input occurrence data indicating particular data value(s) input to the given GUI control instance during the testing of the GUI.

In the example of FIG. 1, instructions 124 may determine an event coverage metric for the given GUI control instance based on the event occurrence data. In examples described herein, an event coverage metric for a GUI control instance of a GUI may be information representing the proportion of one or more target event types associated with the GUI control instance that were invoked for the GUI control instance as part of at least one of testing and other usage of the GUI. In some examples, the event coverage metric may represent the proportion of the target event type(s) invoked for the GUI control instance as part of any testing or other usage of the GUI for which the event occurrence data was recorded. The information representing the proportion may be a value between 0 and 1 (inclusive), a value representing a percentage, a ratio, or any other suitable representation of the proportion. As described above, the target event type(s) associated with a GUI control instance may include all of the event types associated with the GUI control instance, or a select set of less than all of the event types associated with the GUI control instance.

In some examples, determining the event coverage metric for a GUI control instance may comprise calculating the event coverage metric utilizing the following formula (Formula 1):

$$EC(C) = \frac{Re(C)}{Te(C)}$$

In Formula 1, "C" represents a GUI control instance, "EC(C)" represents the event coverage metric for the GUI control instance, "Re(C)" represents the number of target event type(s) recorded for the GUI control instance as indicated by the event occurrence data, and "Te(C)" represents the total number of target event type(s) associated with the GUI control instance. For example, the GUI control instance may be an "OK" button (e.g., OK button 248 of FIG. 2, described further below) associated with two target event types, namely a click event type and a mouse-over event type. In some examples, the event occurrence data may indicate that at least one click event was recorded for the GUI control instance, while no mouse-over events were recorded for the GUI control instance. In such examples, only one of the two target event types were recorded, and the event coverage metric for the OK button may be EC(OK button)=1/2=0.5 (50%). In such examples, the event coverage metric for the OK button may be the same regardless of how many click events were performed on the OK button (GUI control instance), as each such event is an instance of the same type of event (e.g., the click event type).

In the example of FIG. 1, the given GUI control instance may be associated with one or more data values. In such examples, instructions 126 may determine an input coverage metric for the given GUI control instance based on the input occurrence data. In examples described herein, the input coverage metric for a GUI control instance of a GUI may be information representing the proportion of one or more data values associated with the GUI control instance that were input to the given GUI control instance as part of at least one of testing and other usage of the GUI. In some examples, the input coverage metric may represent the proportion of the data value(s) input to the GUI control instance as part of any testing or other usage of the GUI for which the input occurrence data was recorded. The information representing the proportion may be a value between 0 and 1 (inclusive), a value representing a percentage, a ratio, or any other suitable representation of the proportion.

In the example of FIG. 1, the input coverage metric determined by instructions 126 for the given GUI control instance may be an input selection coverage metric or a free input coverage metric. In such examples, instructions 126 may determine whether the given GUI control instance is an input selection GUI control instance. If so, instructions 126 may determine an input selection coverage metric for the given GUI control instance as the input coverage metric for the given GUI control instance. In some examples, the input selection coverage metric may be information representing the proportion of a set of selectable data values associated with a respective input selection GUI control instance that were input to the respective input selection GUI control instance as part of at least one of testing and other usage of the GUI. In examples described herein, data value(s) "associated with" an input selection GUI control instance are the data values presented by the GUI control instance for selection.

In some examples, determining an input selection coverage metric for a GUI control instance may comprise calculating the input selection coverage metric utilizing the following formula (Formula 2):

$$IS(C) = \frac{sizeof(RV(C))}{sizeof(DV(C))}$$

In Formula 2, "C" represents a GUI control instance, "IS(C)" represents the input selection coverage metric for the GUI control instance. "RV(C)" represents the set of data value(s) recorded for the GUI control instance as indicated by the input occurrence data, "DV(C)" represents the total set of data value(s) associated with (e.g., presented for selection by) the GUI control instance, and "sizeof( )" is a function that returns the size of a given set. For example, the GUI control instance may be a dropdown list (e.g., dropdown list 246 of FIG. 2, described further below) associated with five data values. In some examples, the input occurrence data may indicate that the input of three of the associated data values was recorded for the GUI control instance. In such examples, the input selection coverage metric for the dropdown list may be IS(dropdown list)=3/5=0.6 (60%).

In some examples, instructions 126 may further determine whether the given GUI control instance is a free input GUI control instance. If so, instructions 126 may determine a free input coverage metric for the given GUI control instance as the input coverage metric for the given GUI control instance. In some examples, the free input coverage metric may be information representing the proportion of a number of valid and invalid data values associated with a respective free input GUI control instance that were input to the respective GUI control instance as part of at least one of testing and other usage of the GUI.

In some examples, determining a free input coverage metric for a GUI control instance may comprise calculating the free input coverage metric utilizing the following formula (Formula 3):

$$FI(C) = \frac{sizeof(RVv(C)) + sizeof(RVi(C))}{sizeof(DVv(C)) + sizeof(DVi(C))}$$

In Formula 3, "C" represents a GUI control instance, "FI(C)" represents the free input coverage metric for the GUI control instance. "DW(C)" represents a set of valid data value(s) associated with the GUI control instance, and "DVi(C)" represents a set of invalid data value(s) associated with the GUI control instance. Additionally, "RVv(C)" represents a set of data value(s), of the set of valid data value(s), that were recorded for the GUI control instance, as indicated by the input occurrence data. Also, "RVi(C)" represents a set of data value(s), of the set of invalid data value(s), that were recorded for the GUI control instance, as indicated by the input occurrence data. Function "sizeof( )" is defined as described above.

In some examples, valid data values associated with a GUI control instance may be defined by a regular expression, or the like, and invalid data value(s) associated with the GUI control instance may be defined as data value(s) not among the valid data value(s). In such examples, the set of possible values in each set may be exceedingly large. As such, in some examples, the testing tool may automatically populate a set of valid data value(s) for the GUI control instance with at least one example valid data value, for use in the recording of input occurrence data and the calculation of the free input coverage metric. In such examples, the testing tool may also automatically populate a set of invalid data value(s) for the GUI control instance with at least one example invalid data value. In such examples, tests performed on the GUI may utilize one or more of these example valid and invalid data values to test the GUI control instance, and the free input coverage metric may indicate the coverage of the GUI control instance in terms of the proportion of the example valid and invalid values that were input during testing.

In some examples, a user may manually add additional values to each of the sets of valid and invalid data value(s). In other examples, the set of valid data value(s) and the set of invalid data value(s) may each be populated manually. For example, a user of a testing tool may manually populate these sets in the testing tool. In examples described herein, data value(s) "associated with" a free input GUI control instance are the data value(s) included in the set of valid data values and the data value(s) included in the set of invalid data values for the free input GUI control instance.

As an example, the GUI control instance may be a textbox (e.g., textbox 244 of FIG. 2, described further below). In such examples, the textbox may be associated with a set of four valid data values and a set of four invalid data values (although it may be possible to many more valid and invalid data values), and the input occurrence data may indicate that the input of two values of each set was recorded for the GUI control instance. In such examples, the free input coverage metric for the textbox may be FI(textbox)=2+2/4+4=4/8=0.5 (50%).

In some examples, after determining the event and input coverage metrics for the given GUI control instance, instructions 126 may output the determined event and input coverage metrics. In some examples, instructions 122, 124, and 126 may be part of a larger set of instructions (stored at least in part on storage medium 120) implementing a GUI testing tool. In such examples, instructions 126 may output a report indicating the determined event and input coverage metrics via a user interface of the GUI testing tool. In this manner, the event and input coverage metrics may be presented to a user of the GUI testing tool.

As noted above, a set of target event type(s) associated with a given GUI control instance may be a select set of less than all of the types of events associated with the given GUI control instance. In some examples, instructions 124 may determine the set of target event type(s) associated with the given GUI control instance. In such examples, instructions 124 may determine which of the event type(s) associated with the given GUI control instance is a target event type (i.e., is part of the set of target event type(s) for the GUI control instance). For example, instructions 124 may receive indication(s) of which of the event type(s) associated with the given GUI control instance are target event type(s). In such examples, instructions 124 may receive the indication(s) from a user of a testing tool via a user interface of the testing tool. For example, the user interface may present filtering controls allowing a user to specify which event type(s) are to be target event type(s) for a GUI control instance. In other examples, instructions 124 may select the target event types for the given GUI control instance via an automated process without user input. In such examples, instructions 124 may determine that each event types associated with the given GUI control instance and that has a corresponding event handler associated with the GUI control instance is a target event type for the given GUI control.

In some examples, the GUI of the application comprises a plurality of GUI control instances. The plurality may include the given GUI control instance referred to above. In such examples, instructions 124 may determine one or more target events for each of the plurality of GUI control instances of a given control type. In such examples, each GUI control instance of the given control type may be associated with the same set of target event type(s). In such examples, instructions 124 may receive indication(s) of which of the event type(s), associated with the given GUI control type, are target event type(s). For example, instructions 124 may receive such indication(s) from a user interface of a user interface of a testing tool. In such examples, the user interface may include filtering controls allowing a user to specify target event type(s) for all GUI control instances of a given GUI control type. In other examples, instructions 124 may select the target event type(s) for a given GUI control type based on, for example, which event type(s) have a corresponding event handlers associated with the GUI control instances of that type.

In some examples, instructions 124 may further determine a respective event coverage metric for each of the plurality of GUI control instances. In such examples, each of event coverage metrics may be determined as described above. Additionally, instructions 126 may further determine an input selection coverage metric for each input selection GUI control instance of the plurality of GUI control instances, and may determine a free input coverage metric for each free input GUI control instance of the plurality of GUI control instances. Each of the input selection coverage metric(s) and the free input coverage metric(s) may be determined as described above. In some examples, after determining the event and input coverage metrics for the plurality of GUI control instances, instructions 126 may output the determined event and input coverage metrics, as described above.

Although the example of FIG. 1 has been described above in context of GUI testing, examples described herein may be utilized in other contexts. For example, instructions 122, 124, and 126 may be part of a usage monitoring tool. In such examples, instructions 122 may acquire event and input occurrence data, as described above, but indicating usage of a GUI by a user, rather than the testing of the GUI. In such examples, instructions 124 and 126 may determine event and input coverage metrics for user usage of the GUI.

In some examples, instructions 122, 124, and 126 may be part of an installation package that, when installed, may be executed by processing resource 110 to implement the functionalities described herein in relation to instructions 122, 124, and 126. In such examples, storage medium 120 may be a portable medium, such as a CD, DVD, or flash dive, or a memory maintained by a server from which the installation package can be downloaded and installed. In other examples, instructions 122, 124, and 126 may be part of an application, applications, or component already installed on computing device 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-4.

Figure 2:
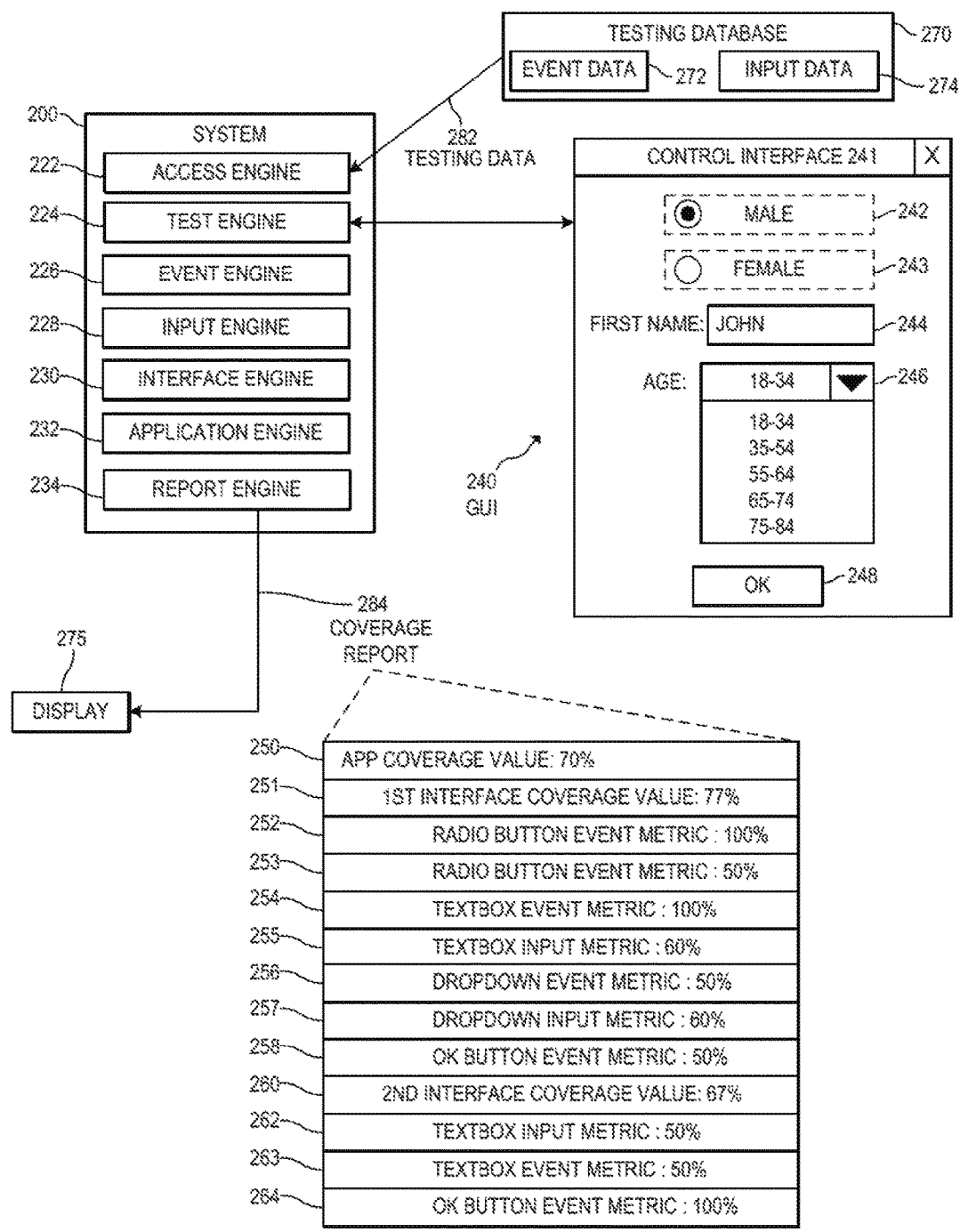
FIG. 2 is a block diagram of an example system to output a report indicating event and input coverage metrics for a GUI control instance.

FIG. 2 is a block diagram of an example system 200 to output a report indicating event and input coverage metrics for a GUI control instance. In the example of FIG. 2, system 200 includes engines 222, 224, 226, 228, 230, 232, and 234. In some examples, system 200 may include additional engines. Each of the engines of system 200, may be any combination of hardware and programming to implement the functionalities of the respective engine. Such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement system 200. The machine-readable storage medium storing the instructions may be integrated in a computing device including the processing resource to execute the instructions, or the machine-readable storage medium may be separate but accessible to the computing device and the processing resource. The processing resource may comprise one processor or multiple processors included in a single computing device or distributed across multiple computing devices. In other examples, the functionalities of any of the engines may be implemented in the form of electronic circuitry.

In some examples, the instructions can be part of an installation package that, when installed, can be executed by the processing resource to implement system 200. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on a computing device including the processing resource. In such examples, the machine-readable storage medium may include memory such as a hard drive, solid state drive, or the like.

In the example of FIG. 2, system 200 is in communication with a testing database 270 and a display 275. In some examples, a computing device may comprise system 200, testing database 270, and display 275. In other examples, at least one of testing database 270 (or a portion thereof) and display 275 may be remote from but in communication with a computing device implementing system 200.

In the example of FIG. 2, test engine 224 may implement testing of a GUI 240 of an application. In such examples, system 200 may be part of a GUI testing tool, as described above in relation to FIG. 1. Engine 224 may interact with GUI 240, which may be executed on a computing device at least partially implementing system 200, or on a computing device remote from but in communication with a computing device at least partially implementing system 200. GUI 240 may comprise a GUI control instance associated with a plurality of data values, such as GUI control instance 244 or 246. In some examples. GUI 240 may comprise at least one control interface, wherein each of the control interface(s) includes at least one GUI control instance. As used herein, a "control interface" of a GUI is a graphical area of the GUI to display a set of GUI control instance(s) for interaction. Example control interfaces of a GUI include a window, a dialog, a web page (of a website implementing the GUI), and the like. In the example of FIG. 2. GUI 240 includes at least a first control interface 241, which may be a window or web page of GUI 240. In some examples, GUI 240 may include at least one a second control interface (window, dialog, web page, etc.) including at least one GUI control instance.

Test engine 224 may perform at least one of manual testing of GUI 240 (e.g., via interaction of a user) and automated testing of GUI 240. In some examples, engine 224 may perform testing on at least one of the control interfaces of GUI 240. Engine 224 may further record event occurrence data and input occurrence data associated with the testing performed on GUI 240, as described above in relation to FIG. 1. In such examples, engine 224 may store the recorded event and input occurrence data in testing database 270.

In the example of FIG. 2, access engine 222 may access testing data 282, including event occurrence data 272 and input occurrence data 274 identifying at least one interaction performed on GUI 240. Engine 222 may access the data 272 and 274 in any manner described above in relation to FIG. 1. Event occurrence data 272 may include event occurrence data recorded by system 200 during at least one test of GUI 240, event occurrence data recorded by at least one system other than system 200 during at least one test of GUI 240, or a combination thereof. Input occurrence data 274 may include input occurrence data recorded by system 200 during at least one test of GUI 240, input occurrence data recorded by at least one system other than system 200 during at least one test of GUI 240, or a combination thereof.

In the example of FIG. 2, control interface 241 (e.g., window 241) of GUI 240 may include a plurality of GUI control instances, including a GUI control instance 246 (e.g., a dropdown list 246). In such examples, GUI control instance 246 is associated with a plurality of data values (e.g., age ranges presented by dropdown list 246). In such examples, event and input occurrence data 272 and 274 may include event and input occurrence data for GUI control instance 246.

Event engine 226 may determine an event coverage metric for GUI control instance 246 based on event occurrence data 272, as described above in relation to FIG. 1. Additionally, input engine 228 may determine an input coverage metric for GUI control instance 246 based on the input occurrence data 274, as described above in relation to FIG. 1. Report engine 234 may output a coverage report 284 indicating the event coverage metric and the input coverage metric determined for GUI control instance 246. In some examples, report engine 234 may output coverage report 284 on display 275. In other examples, engine 234 may output coverage report 284 in any other suitable manner. Coverage report 284 may include an indication 256 of the event coverage metric for GUI control instance 246 and an indication 257 of the input coverage metric for GUI control instance 246. In some examples, each indication of an event or input coverage metric that is part of application coverage value report 284 may include information identifying the metric and a representation of the metric as a percentage, or in any other suitable form.

Although examples have been described herein in relation to GUI control instance 246, system 200 may determine event coverage metrics, as described above, for any GUI control instance of GUI 240, and may determine input coverage metrics, as described above, for any GUI control instance of GUI 240 associated with a plurality of data values (e.g., any input selection GUI control instance and any free input GUI control instance).

In the example of FIG. 2, GUI 240 includes a first control interface 241 including a first plurality of GUI control instances 242, 243, 244, 246, and 248. GUI control instances 242 and 243 may each be radio buttons, GUI control instance 244 may be a textbox, and GUI control instance 248 may be an OK button. In such examples, event engine 226 may determine a respective event coverage metric for each of the plurality of GUI control instances of first control interface 241. For example, engine 226 may determine a respective event coverage metric for each of GUI control instances 242, 243, 244, 246, and 248. In such examples, event occurrence data 272 may include event occurrence data for each of the first plurality of GUI control instances, and engine 226 may determine the respective event coverage metrics based on event occurrence data 272.

Input engine 228 may further determine a respective input coverage metric for at least one of the GUI control instances of first control interface 241. For example, engine 228 may determine an input coverage metric (i.e., an input selection coverage metric) for each input selection GUI control instance of control interface 241 (e.g., for dropdown list 246) and may determine an input coverage metric (i.e., a free input coverage metric) for each free input GUI control instance of control interface 241 (e.g., textbox 244). In such examples, engine 228 may determine the input coverage metrics based on input occurrence data 274.

In such examples, report engine 234 may output a coverage report 284 indicating the determined event and input coverage metrics for the GUI control instances of first control interface 241. For example, coverage report 284 may include indications 252, 253, 254, 256, and 258 of respective event coverage metrics for each of the GUI control instances of first control interface 241. Coverage report 284 may also include indications 255 and 257 of respective input coverage metrics for GUI control instances 244 and 246 of first control interface 241.

In the example of FIG. 2, interface engine 230 may calculate, based on event and input occurrence data 272 and 274, a first control interface coverage value representing cumulative event coverage and input coverage for the first control interface. In examples described herein, a control interface coverage value for a control interface may be a representation of cumulative event and input coverage for a plurality of GUI control instances of the control interface. In some examples, interface engine 230 may calculate an interface coverage value based on event and input occurrence data utilizing the following formula (Formula 4):

$$CI(I) = \frac{\Sigma_c Re(C) + \Sigma_{c'} sizeof(RV(C')) + \Sigma_{c''}(sizeof(RVv(C'')) + sizeof(RVi(C'')))}{\Sigma_c Te(C) + \Sigma_{c'} sizeof(DV(C')) + \Sigma_{c''}(sizeof(DVv(C'')) + sizeof(DVi(C'')))}$$

In Formula 4, "I" represents a control interface, "CI(I)" represents the control interface coverage value for the control interface, C represents a GUI control instance of the control interface for which event occurrence data is accessed (e.g., each GUI control instance of the control interface), C' represents each input selection GUI control instance of the control interface for which input occurrence data is accessed, and C" represents each free input GUI control instance of the control interface for which input occurrence data is accessed. Other parameters of Formula 4 are as described above in relation to Formulas 1-3. In other examples, a control interface coverage value may be calculated based on event and input occurrence data in any suitable manner.

In some examples, coverage report 284 output by report engine 234 may include an indication 251 of the calculated first control interface coverage value in addition to indications 252-258 of the determined event and input coverage metrics for the GUI control instances of first control interface 241. In some examples, each indication of a control interface coverage value that is part of report 284 may include information identifying the value and a representation of the value as a percentage, or in any other suitable form.

As noted above, in some examples, GUI 240 may include at least one other control interface, in addition to first control interface 241. In such examples, system 200 may determine event and input coverage metrics for the GUI control instances of the other control interface(s), and determine respective control interface coverage value(s) for the other control interface(s). For example, GUI 240 may include a second control interface, different than first control interface 241, including a second plurality of GUI control interfaces. In such examples, event engine 226 may determine a respective event coverage metric for each of the second plurality of GUI control instances of a second control interface, and input engine 228 may determine a respective input coverage metric for any input selection or free input GUI control instances of the second control interface.

In some examples, interface engine 230 may further calculate, based on the event and input occurrence data, a second control interface coverage value representing cumulative event coverage and input coverage for the second control interface. In such examples, coverage report 284 output by engine 234 may include an indication 260 of the second control interface coverage value, and respective indications (e.g., 262-264) of event and input coverage metrics determined for the GUI control instances of the second control interface, in addition to indications 251-258 described above.

In the example of FIG. 2, application engine 232 may calculate an application coverage value based on the event and input occurrence data associated with non-navigational GUI control instances of the first and second control interfaces of GUI 240. In examples described herein, an application coverage value for a GUI of an application may be a representation of cumulative event and input coverage for GUI control instances of a plurality of control interfaces of the GUI, excluding navigational GUI control instances. As used herein, a navigational GUI control instance may be a GUI a control instance that exclusively provides functionalities for navigation between control interfaces (e.g., windows, web pages) of a GUI. Examples of navigational GUI control instances may include links, tabs, some types of buttons, etc. In examples described herein, a non-navigational GUI control instance may be a GUI control instance that does not exclusively provide functionalities for navigation. In such examples, coverage report 284 output by engine 234 may include an indication 250 of the calculated application coverage value for GUI 240, in addition to indications 251-264 described above. In some examples, each indication of application coverage value that is part of report 284 may include information identifying the value and a representation of the value as a percentage, or in any other suitable form.

In some examples, application engine 232 may calculate the application coverage value based on event and input occurrence data associated with the non-navigational GUI control instances utilizing Formula 4 described above. In some examples, system 200 (or a GUI testing tool of which system 200 is a part) may maintain a user interface (UI) map of GUI 240. In such examples the UI map may represent every component of GUI 240 (e.g., each control interface, each GUI control instance, etc.) as a node in a tree representing the hierarchical structure of GUI 240. In such examples, each non-navigational GUI control instance of GUI 240 may be represented by a leaf node of the tree. In such examples, application engine 232 may calculate the application coverage value based on the event and input occurrence data associated with each leaf node of the tree (i.e., the non-navigational GUI control instances) utilizing Formula 4.

Although the example of FIG. 2 has been described above in context of GUI testing, examples described herein may be utilized in other contexts. For example, system 200 may be part of a usage monitoring tool. In such examples, access engine 222 may acquire event and input occurrence data, as described above, but indicating usage of GUI 240 by user(s), rather than data related to testing of GUI 240. In such examples, engines 226, 228, 230, and 232 may determine at least one of event and input coverage metrics, control interface coverage values, and application coverage values for user usage of GUI 240. Such metrics and values may be determined for usage by one user, or a plurality of users, and for one interaction with the GUI, or multiple different interactions with the GUI by the user(s). The metrics and values may be determined based on the event and input occurrence data for such interactions stored in a database accessible to system 200, like testing database 270. In some examples, functionalities described herein in relation to FIG. 2 may be provided in combination with functionalities described herein in relation to any of FIGS. 1 and 3-4.

Figure 3:
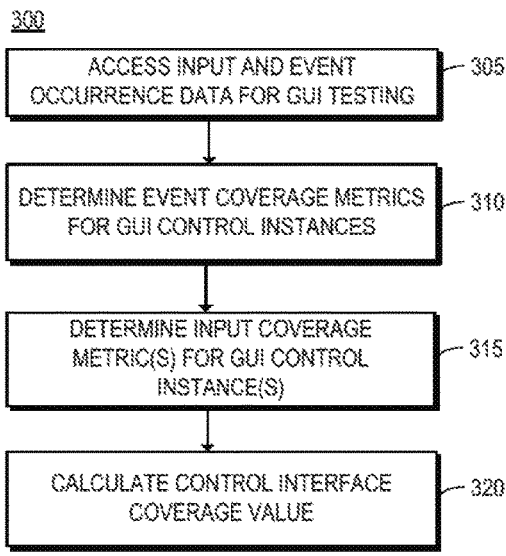
FIG. 3 is a flowchart of an example method for determining event and input coverage metrics for a GUI control instance.

FIG. 3 is a flowchart of an example method 300 for determining event and input coverage metrics for a GUI control instance. Although execution of method 300 is described below with reference to system 200 of FIG. 2, other suitable systems for execution of method 300 can be utilized (e.g., computing device 100). Additionally, implementation of method 300 is not limited to such examples.

At 305 of method 300, access engine 222 may access testing data 282 of testing database 270. Testing data 282 may include event and input occurrence data 272 and 274 associated with of at least one test performed on GUI 240 of an application, wherein GUI 240 includes a control interface 241 comprising a plurality of GUI control instances (e.g., GUI control instances 242, 243, 244, 246, and 248).

At 310, event engine 226 may determine, based on event occurrence data 272, an event coverage metric for each of the plurality of GUI control instances, including a given one of the GUI control instances. At 315, input engine 228 may determine, with a processing resource of a computing device, a respective input coverage metric for at least the given one of the GUI control instances based on input occurrence data 274. At 320, interface engine 230 may calculate, based on event and input occurrence data 272 and 274, a control interface coverage value representing cumulative event coverage and input coverage for control interface 241.

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1-2 and 4.

Figure 4:
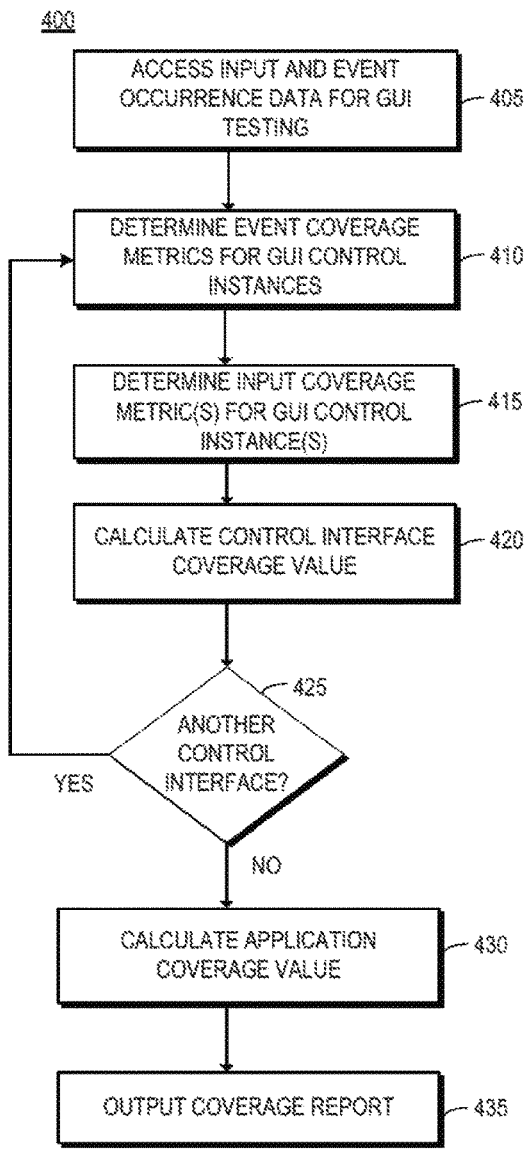
FIG. 4 is a flowchart of an example method for outputting a coverage report including event and input coverage metrics, and interface coverage values.

FIG. 4 is a flowchart of an example method 400 for outputting a coverage report including event and input coverage metrics, and interface coverage values. Although execution of method 400 is described below with reference to system 200 of FIG. 2, other suitable systems for execution of method 400 can be utilized (e.g., computing device 100). Additionally, implementation of method 400 is not limited to such examples.

At 405 of method 400, access engine 222 may access testing data 282 of testing database 270, the testing data 282 including event and input occurrence data 272 and 274 associated with of at least one test performed on GUI 240 of an application. GUI 240 may include a first control interface 241 comprising a first plurality of GUI control instances, and a second control interface comprising a second plurality of GUI control instances.

At 410, event engine 226 may determine, based on event occurrence data 272, an event coverage metric for each of the first plurality of GUI control instances, including a given one of the GUI control instances. At 415, input engine 228 may determine, with a processing resource of a computing device, a respective input coverage metric for at least the given one of the first plurality of GUI control instances based on input occurrence data 274. At 420, interface engine 230 may calculate, based on event and input occurrence data 272 and 274, a first control interface coverage value representing cumulative event coverage and input coverage for first control interface 241.

At 425, interface engine may determine whether GUI 240 includes another control interface for which to calculate event and input coverage metrics and a control interface coverage value. If not, then method 400 may proceed to 430. If so, then method 400 may return to 410. In some examples, GUI 240 may include a second control interface including a second plurality of GUI control instances.

Returning to 410, event engine 226 may determine, based on event occurrence data 272, an event coverage metric for each of the second plurality of GUI control instances. At 415, input engine 228 may determine a respective input coverage metric for at least the given one of the second plurality of GUI control instances based on input occurrence data 274. At 420, interface engine 230 may calculate, based on event and input occurrence data 272 and 274, a second control interface coverage value representing cumulative event coverage and input coverage for the second control interface of GUI 420.

At 430, application engine 232 may calculate an application coverage value for GUI 240 based on data, of event and input occurrence data 272 and 274, associated with non-navigational GUI control instances of the GUI control instances of each of the control interfaces of GUI 240. In such examples, the application coverage value may represent cumulative event coverage and input coverage for GUI 240 of the application excluding navigational GUI control instances. At 435, report engine 234 may output a coverage report 284 indicating the application coverage value, each of the calculated interface coverage values, and the event and input coverage metrics for the GUI control instances of each of the control interfaces of GUI 240.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3.

What is claimed is:

1. A non-transitory machine-readable storage medium encoded with instructions executable by a processing resource of a computing device to:

access event and input occurrence data identifying interactions performed on a graphical user interface (GUI) of an application during testing of the GUI, the GUI comprising a given GUI control instance of a plurality of GUI control instances;

implement a testing tool including a testing tool user interface, the testing tool user interface including filtering controls to specify a target event type for the given GUI control instance, wherein the given GUI control instance is of a given GUI control type;

receive an indication of a target event type specified via the testing tool user interface;

associate the specified target event type with the given GUI control type;

determine an event coverage metric for the given GUI control instance based on the event occurrence data, the specified target event type, and the given GUI control type, wherein the event coverage metric represents a proportion of one or more target event types that were invoked for the given GUI control instance as part of the testing, and wherein the one or more target event types includes the specified target event type; and determine an input coverage metric for the given GUI control instance based on the input occurrence data, wherein the input coverage metric represents a proportion of data values that were input to the given GUI control instance as part of the testing, and further wherein the instructions to determine the input coverage metric comprise instructions to determine a free input coverage metric for each free input of the given GUI control instance, wherein each free input coverage metric represents, for a respective free input GUI control instance associated with valid and invalid data values, a proportion of the valid and invalid data values that were input to the respective free input GUI control instance as part of the testing.

2. The storage medium of claim 1, wherein the given GUI control instance is associated with the data values.

3. The storage medium of claim 1, wherein the instructions to determine the input coverage metric comprise instructions to:

determine an input selection coverage metric for each input selection GUI control instance of the plurality of GUI control instances;

wherein each input selection coverage metric represents, for a respective input selection GUI control instance associated with a set of selectable data values, a proportion of the data values that were input to the respective input selection GUI control instance as part of the testing.

4. The storage medium of claim 3, wherein the input coverage metric for the given GUI control instance is one of an input selection coverage metric and a free input coverage metric.

5. The storage medium of claim 4, wherein the instructions to determine the event coverage metric comprise instructions to:

determine one or more target event types associated with each of the plurality of GUI control instances of a given control type; and determine a respective event coverage metric for each of the plurality of GUI control instances;

wherein, for each GUI control instance of the given control type, the determined event coverage metric represents a proportion of the one or more target event types associated with the GUI control instance that were invoked for the GUI control instance as part of the testing.

6. A system comprising:
a processor; and
a non-transitory computer readable medium storing machine readable instructions, wherein the processor executes the machine readable instructions to:
  access event and input occurrence data identifying at least one interaction performed on a graphical user interface (GUI) of an application, the GUI comprising a given GUI control instance of a plurality of GUI control instances associated with a plurality of data values;
  implement a testing tool including a testing tool user interface, the testing tool user interface including filtering controls to specify a target event type for the given GUI control instance, wherein the given GUI control instance is of a given GUI control type;
  receive an indication of a target event type specified via the testing tool user interface;
  associate the specified target event type with the given GUI control type;
  determine, based on the event occurrence data, the specified target event type, and the given GUI control type, an event coverage metric for the given GUI control instance, wherein the event coverage metric represents a proportion of one or more target event types that were invoked for the given GUI control instance as part of the at least one interaction, and wherein the one or more target event types includes the specified target event type;
  determine, based on the input occurrence data, an input coverage metric for the given GUI control instance, the input coverage metric representing a proportion of the data values that were input to the given GUI control instance as part of the at least one interaction, and further wherein the instructions to determine the input coverage metric comprise instructions to determine a free input coverage metric for each free input of the given GUI control instance, wherein each free input coverage metric represents, for a respective free input GUI control instance associated with valid and invalid data values, a proportion of the valid and invalid data values that were input to the respective free input GUI control instance as part of the at least one interaction; and
  output a report indicating the event coverage metric and the input coverage metric for the given GUI control instance.

7. The system of claim 6, wherein the processor executes the machine readable instructions to:
  record the event occurrence data and the input occurrence data associated with the at least one interaction performed on the GUI.

8. The system of claim 6, wherein:
  the GUI includes a first control interface comprising a first plurality of GUI control instances, including the given GUI control instance; and
  the processor executes the machine readable instructions to determine a respective event coverage metric for each of the GUI control instances of the first control interface.

9. The system of claim 8, wherein the processor executes the machine readable instructions to:
  calculate, based on the event and input occurrence data, a first control interface coverage value representing cumulative event coverage and input coverage for the first control interface; and
  determine a respective input coverage metric for at least one of the GUI control instances of the first control interface; and
  wherein the report further indicates the first control interface coverage value and the event and input coverage metrics for the GUI control instances of the first control interface.

10. The system of claim 9, wherein the processor executes the machine readable instructions to:
  determine a respective event coverage metric for each of a second plurality of GUI control instances of a second control interface of the GUI;
  determine a respective input coverage metric for at least one of the GUI control instances of the second control interface; and
  calculate, based on the event and input occurrence data, a second control interface coverage value representing cumulative event coverage and input coverage for the second control interface.

11. The system of claim 10, wherein the processor executes the machine readable instructions to:
  calculate an application coverage value based on the event and input occurrence data associated with non-navigational GUI control instances of the GUI control instances of the first and second control interfaces, the application coverage value representing event coverage and input coverage for the GUI of the application;
  wherein the report further indicates the event and input coverage metrics for the GUI control instances of the second control interface, the second control interface coverage value, and the application coverage value; and
  wherein the at least one interaction comprise interactions performed on the GUI as part of a plurality of tests performed on the GUI.

12. A method comprising:
  accessing testing data of a testing database, the testing data including event and input occurrence data associated with at least one test performed on a graphical user interface (GUI) of an application, the GUI having a control interface comprising a plurality of GUI control instances including a given GUI control instance;
  implementing a testing tool including a testing tool user interface, the testing tool user interface including filtering controls to specify a target event type for the given GUI control instance, wherein the given GUI control instance is of a given GUI control type;
  receiving an indication of a target event type specified via the testing tool user interface;
  associating the specified target event type with the given GUI control type;
  determining, based on the event occurrence data, the specified target event type, and the given GUI control type, an event coverage metric for each of the plurality of GUI control instances, including the given GUI control instance, wherein the event coverage metric for each of the plurality of GUI control instances represents a proportion of one or more target event types that were invoked for the given GUI control instance, and wherein the one or more target event types includes the specified target event type;
  determining, with a processing resource of a computing device, a respective input coverage metric for at least the given GUI control instance based on the input occurrence data, wherein the respective input coverage metric represents a proportion of data values that were input to the given GUI control instance, and further wherein determining the input coverage metric includes determining a free input coverage metric for each free input of the given GUI control instance, wherein each free input coverage metric represents, for a respective free input GUI control instance associated with valid and invalid data values, a proportion of the valid and invalid data values that were input to the respective free input GUI control instance; and calculating, based on the event and input occurrence data, a control interface coverage value representing cumulative event coverage and input coverage for the control interface.

13. The method of claim 12, wherein the GUI comprises another control interface including another plurality of GUI control instances, the method further comprising:

determining, based on the event occurrence data, an event coverage metric for each of the GUI control instances of the other control interface;

determining, based on the input occurrence data, a respective input coverage metric for at least one of the GUI control instances of the other control interface; and calculating, based on the event and input occurrence data, another control interface coverage value representing cumulative event coverage and input coverage for the other control interface.

14. The method of claim 13, further comprising:

calculating an application coverage value based on data, of the event and input occurrence data, associated with non-navigational GUI control instances of the GUI control instances of each of the control interfaces, the application coverage value representing event coverage and input coverage for the GUI of the application; and outputting a coverage report indicating the application coverage value, each of the calculated interface coverage values, and the event and input coverage metrics for the GUI control instances of each of the control interfaces.

* * * * *